United States Patent [19]
Fife

[11] Patent Number: 5,211,741
[45] Date of Patent: May 18, 1993

[54] FLAKED TANTALUM POWDER

[75] Inventor: James A. Fife, Thornbury Bristol, United Kingdom

[73] Assignee: Cabot Corporation, Boston, Mass.

[21] Appl. No.: 738,852

[22] Filed: Jul. 31, 1991

Related U.S. Application Data

[60] Continuation-in-part of Ser. No. 462,806, Jan. 10, 1990, abandoned, which is a division of Ser. No. 209,746, Jun. 4, 1988, Pat. No. 4,940,490, which is a continuation-in-part of Ser. No. 126,706, Nov. 30, 1987, abandoned.

[51] Int. Cl.$^5$ .............................................. C22C 27/02
[52] U.S. Cl. ..................................... 75/255; 420/427; 361/529
[58] Field of Search ................. 75/229, 255; 420/427; 204/292; 361/529

[56] References Cited

U.S. PATENT DOCUMENTS

| | | | |
|---|---|---|---|
| 3,647,415 | 3/1972 | Yano et al. | 75/255 |
| 4,017,302 | 4/1977 | Bates et al. | 420/427 |
| 4,141,719 | 2/1979 | Hakko | 361/529 |
| 4,740,238 | 4/1988 | Schiele | 420/427 |
| 4,940,490 | 7/1990 | Fife et al. | 420/427 |
| 4,954,169 | 9/1990 | Behrens | 420/427 |
| 5,082,491 | 1/1992 | Rerat | 75/255 |

*Primary Examiner*—George Wyszomierski
*Attorney, Agent, or Firm*—David J. Koris

[57] ABSTRACT

The invention relates to flaked tantalum powders suitable for use in electrodes and capacitors. The tantalum powders have a mean particle size of about 2 to 55 micrometers, a BET surface area greater than about 0.5 m$^2$/g, and an aspect ratio between about 2 and 50. The powders are in the form of fractured flakes, which contain substantially no tapering of their peripheral edges.

18 Claims, 5 Drawing Sheets

Fractured Tantalum Flake
1000X Magnification

Conventional Tantalum Flake
1000X Magnification

Fractured Tantalum Flake
1000X Magnification

F I G. 5
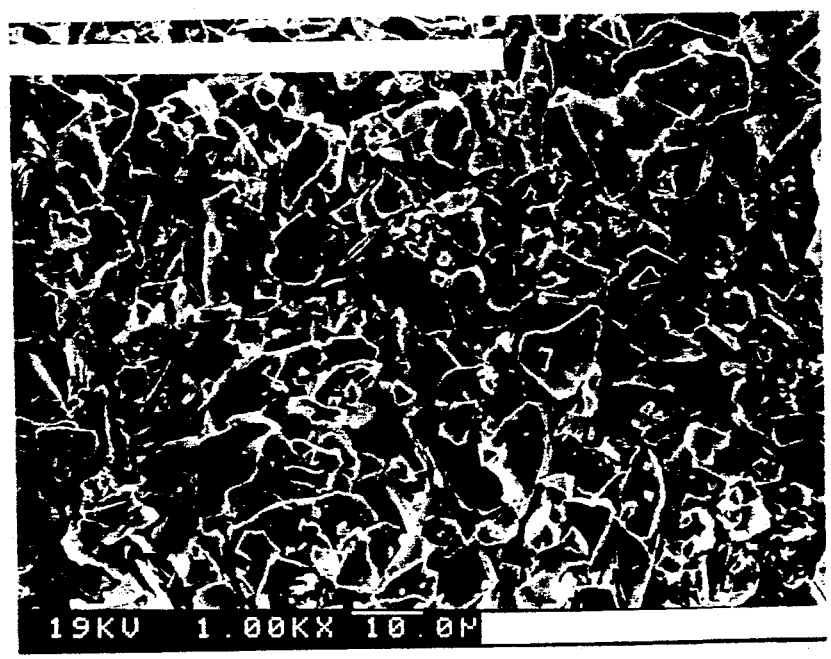
F I G. 6

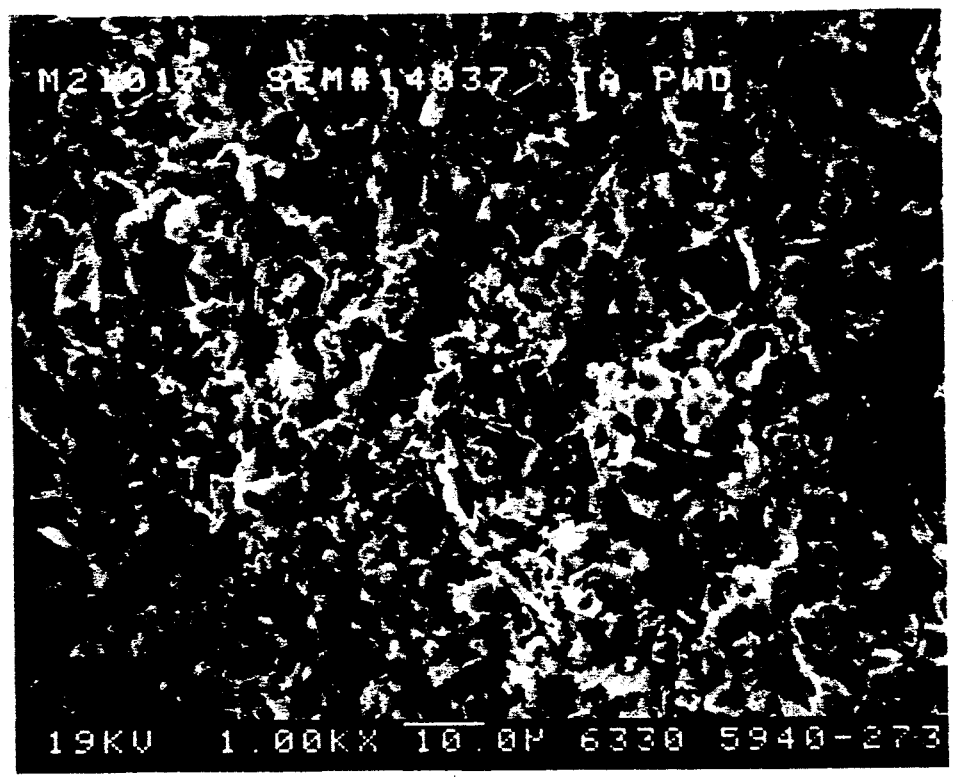
F I G. 7

FLAKED TANTALUM POWDER

CROSS-REFERENCE TO RELATED APPLICATIONS

This application is a continuation-in-part of Ser. No. 462,806, Jan. 10, 1990, abandoned which is a division of Ser. No. 209,746, Jun. 4, 1988, now U.S. Pat. No. 4,940,490, which is a continuation-in-part of Ser. No. 126,706, Nov. 30, 1987, now abandoned.

FIELD OF INVENTION

The invention relates to flaked tantalum powders often used for electrical capacitors and methods for using such powders to make low density pellets used for making capacitors. More particularly, the invention relates to flaked tantalum powders, having a specified aspect ratio, which when agglomerated provide the required good processing properties, e.g., flowability, high green strength and pressability. These flaked tantalum powders can also make capacitors having low leakage and high breakdown voltages.

BACKGROUND OF THE INVENTION

Tantalum capacitors, made from tantalum powder, have been a major contributor to the miniaturization of electronic circuits and have made possible the application of such circuits in extreme environments. Tantalum capacitors typically are manufactured by compressing agglomerated tantalum powder to form a pellet, sintering the pellet in a furnace to form a porous tantalum body (electrode), and then subjecting the porous body to anodization in a suitable electrolyte to form a continuous dielectric oxide film on the sintered body.

Development of powders suitable for making tantalum capacitors has resulted from efforts by both capacitor producers and tantalum processors to delineate the characteristics required for tantalum powder in order for it to best serve in the production of quality capacitors. Such characteristics include specific surface area, purity, shrinkage, pressability, green strength, and flowability.

First of all, the powder should provide an adequate electrode surface area when formed into a porous body and sintered. The ufV/g of tantalum capacitors is proportional to the specific surface area of the sintered porous body produced by sintering a tantalum powder pellet; the greater the specific surface area after sintering, the greater the ufV/g. The specific surface area of tantalum powder is related to the maximum ufV/g attainable in the sintered porous body.

Purity of the powder is an important consideration. Metallic and non-metallic contamination tends to degrade the dielectric oxide film in tantalum capacitors. While high sintering temperatures serve to remove some volatile contaminants high temperatures tend to shrink the porous body reducing its net specific surface area and thus the capacitance of the resulting capacitor. Minimizing the loss of specific surface area under sintering conditions, i.e., shrinkage, is necessary in order to produce high ufV/g tantalum capacitors.

Flowability of the tantalum powder and green strength (mechanical strength of pressed unsintered powder pellets) are also important characteristics for the capacitor producer in order to provide efficient production. The flowability of the agglomerated tantalum powder is essential to proper operation of automatic pellet presses. Sufficient green strength permits handling and transport of a pressed product, e.g., pellet, without excessive breakage.

A 'pellet', as the term is used herein, is a porous mass or body comprised of tantalum particles. Green strength is a measure of a pellet's mechanical strength. The term 'pressability' describes the ability of a tantalum powder to be pressed into a pellet. Tantalum powder that forms pellets that retain their shape and have sufficient green strength to withstand ordinary processing/manufacturing conditions without significant breakage have good pressability.

Currently, tantalum powders suitable for use in high performance capacitors are produced by several methods. One powder production method involves chemical reduction, e.g., sodium reduction of potassium fluorotantalate, $K_2TaF_7$. In another method, powder is produced by hydriding a melted (typically arc melted or electron beam melted) tantalum ingot, milling the hydrided chips, and dehydriding.

As discussed above, the ufV/g of a tantalum pellet is a function of the specific surface area of the sintered powder. Greater net surface area can be achieved, of course, by increasing the quantity (grams) of powder per pellet; but, cost and size considerations have dictated that development be focused on means to increase the specific surface area of tantalum powder.

One of the methods proposed for increasing the specific surface area of tantalum powder is flattening the powder particles into a flake shape.

Efforts to increase specific surface area by making thinner tantalum flakes have been hindered by concomitant loss of processing characteristics, for example, very thin tantalum flake would be expected to have poor flow characteristics, poor pressability, low green strength and low forming voltages. Thinner flakes are desirable however, because they could make less expensive low density pellets which could be used to make capacitors having high breakdown voltages and low leakage losses.

OBJECTS AND SUMMARY OF THE INVENTION

It is an object of this invention to provide a method for making a fractured flake tantalum powder having BET surface area and mean particle size represented by a range of aspect ratios (D/T) of about 2 to about 50.

It is another object of this invention to provide a fractured flake tantalum powder with a BET surface area greater than 0.7 $m^2/g$ and a mean particle size in a range selected to yield an aspect ratio (D/T) that has powder properties suitable for use in economical high speed processes for the manufacture of tantalum capacitors; e.g., an aspect ratio in the range of about 2 to 50.

It is another object of this invention to provide an agglomerate of flaked tantalum powder that has good flowability and pressability characteristics.

It is another object of this invention to provide low density flaked tantalum pellets having high green strength.

It is another object of this invention to provide low density flaked tantalum pellets having reduced sensitivity to sintering temperatures, i.e., pellets that can be sintered over a wide range of temperatures, relative to the prior art, to form an electrode useful in a tantalum capacitor.

It is another object of this invention to provide a tantalum electrode having reduced sensitivity to forming voltages, i.e., dielectric oxides can be formed on the electrodes over a range of voltages.

It is another object of this invention to provide a tantalum electrode having low leakage and high breakdown voltages.

The present invention provides a method for making flaked tantalum powder that is flowable and pressable when agglomerated, comprising the steps of:

preparing tantalum flake powder;

reducing the flake size until the powder has a mean particle size in the range of about 2 to about 55 micrometers and BET surface area in the range of about 0.5 to about 5.0 m$^2$/g and selecting said mean particle size and BET surface area so that the flakes have an aspect ratio (D/T) in the range of about 2 to about 50.

The present invention also provides a fractured flake tantalum powder comprised of flakes having a mean particle size in the range of 2 to 55 micrometers and a BET surface area greater than about 0.7 m$^2$/g and an aspect ratio between about 2 and about 50.

The present invention also provides an agglomerate of the above-described flaked tantalum powder having improved o flowability and pressability characteristics. The agglomerated flaked tantalum powder of this invention may be prepared by any conventional method for preparing agglomerates such as, for example, by heating the tantalum flake, described in the preceding paragraphs, to a temperature of about 1300° to 1600° C. in an inert atmosphere or under vacuum for a period of about 30 to 60 minutes and crushing the resulting product to a size in the range of about 40 mesh (0.015 inch screen opening) to 60 mesh (0.0098 inch screen opening).

The present invention also provides low density pellets prepared from the flaked tantalum powder and/or agglomerate described in the preceding paragraphs.

The present invention also provides a capacitor electrode formed from the pellets described in the preceding paragraphs. In general the capacitors are prepared by sintering the pellets described above and anodizing the sintered pellets.

BRIEF DESCRIPTION OF THE DRAWINGS

Other details, objects and advantages of the invention and methods for making and using the same will become apparent from the following detailed description and accompanying Figures. A legend at the bottom of the Scanning Electron Micrograph (SEM) Figures gives the voltage, magnification e.g., 400×, and a reference scale in micrometers.

FIG. 5 is a SEM at a magnification of 1000×, of a prior art flaked tantalum powder produced in accordance with Example I, specimen C, of the U.S. Pat. No 3,647,415 and which is representative of tantalum flake included within the teaching of that patent;

FIG. 6 is a SEM at a magnification of 500×, of a flaked tantalum powder produced by subjecting the flake of FIG. 5 to the process of the invention;

FIG. 7 is a SEM at a magnification of 1000×, of a flaked tantalum powder produced in accordance with the invention, and similar to that shown in FIGS. 2, 4 and except that the particles are smaller and about one-half thickness.

DETAILED DESCRIPTION OF THE INVENTION

Figure 1:
FIG. 1 is a SEM at a magnification 1000×, of a prior art ingot-derived flaked tantalum powder having a Scott Density of 13.4 g/in$^3$.

Flaked tantalum powder may be prepared by deforming or flattening a granular tantalum powder. It will be appreciated by those skilled in the art that this deformation may be accomplished by conventional mechanical techniques using a ball mill, rod mill, roll mill or the like. The flaked tantalum powder of the present invention can be prepared from such conventionally prepared flaked tantalum powder by reducing the size of the flake particles until the mean particle size is in the preferred range of about 2 to about 45 micrometers preferably about 3 to about 20 micrometers and BET surface area is in the range of about 0.5 to about 5.0 m$^2$/g, preferably, about 0.5 to about 5.0 m$^2$/g. The size reduction process may be aided by embrittling the conventional flake by techniques such as hydriding, oxidizing, cooling to low temperatures, or the like, to enhance breakage when reducing the flake particle size by mechanical means such as crushing, or other size reduction processes. The mean particle size and BET surface area are related, as hereinafter described, and that relationship can be expressed as a value, i.e., aspect ratio (D/T). Surprisingly, the BET surface area may exceed 0.7 up to 5.0 m$^2$/g and is preferably in the range of about 0.5 to about 1.5 m$^2$/g without loss of the desired properties as long as mean particle size is adjusted to maintain the aspect ratio preferably, about 5 to about 20.

In the present invention flakes are reduced in size without substantial tapering of the flakes peripheral edges. Consequently, in one embodiment the flaked tantalum powder of the invention is characterized by flakes of substantially uniform thickness from edge to edge which are described herein as "fractured flake". Thickness may be related to BET nitrogen surface area values which are typically in the range of about 0.5 to about 1.5 m$^2$/g. It should be kept in mind, however, that the desired flake properties can also be achieved with substantially thinner flakes (higher BET nitrogen surface areas, e.g., greater that 1.5) if the mean particle size is adjusted to maintain an aspect ratio at less than about 50. Aspect ratios in the range of about 5 to about 20 being preferred.

Aspect ratios 'D/T' of flaked tantalum powders can be calculated from their mean particle size in micrometers and BET (nitrogen) surface area in m$^2$/g in accordance with the following formula:

D/T=(K) (MPS) (BET)

where:

K=2, a constant;
MPS=mean particle size in micrometers; and
BET=BET surface area (nitrogen).

The techniques for measuring MPS and BET are described in greater detail below.

Comparison of FIGS. 1 through 9 illustrates that the flaked tantalum powder of the present invention is comprised of substantially smaller particles than the prior art flakes. The prior art tantalum flake shown in FIG. 1 was prepared from classified 20×44 micrometer ingot-derived (electron beam melted) tantalum chips. The chips were degassed in a vacuum furnace to remove hydrogen and sieved through a 325 mesh screen. The resulting material was then milled in a vibrating ball mill for 10 hours to flatten the chips into flake. This flake was acid leached first in a HCl/HNO$_3$ mixture and then in HF to remove metallic impurities. The resulting flake which had a Scott density of 10.8 g/in$^3$ was heat treated at 1600° C. for 30 minutes to produce an agglomerated material which was then jaw crushed to 40 mesh sized agglomerates having a Scott density of 13.4 g/in$^3$.

Figure 2:
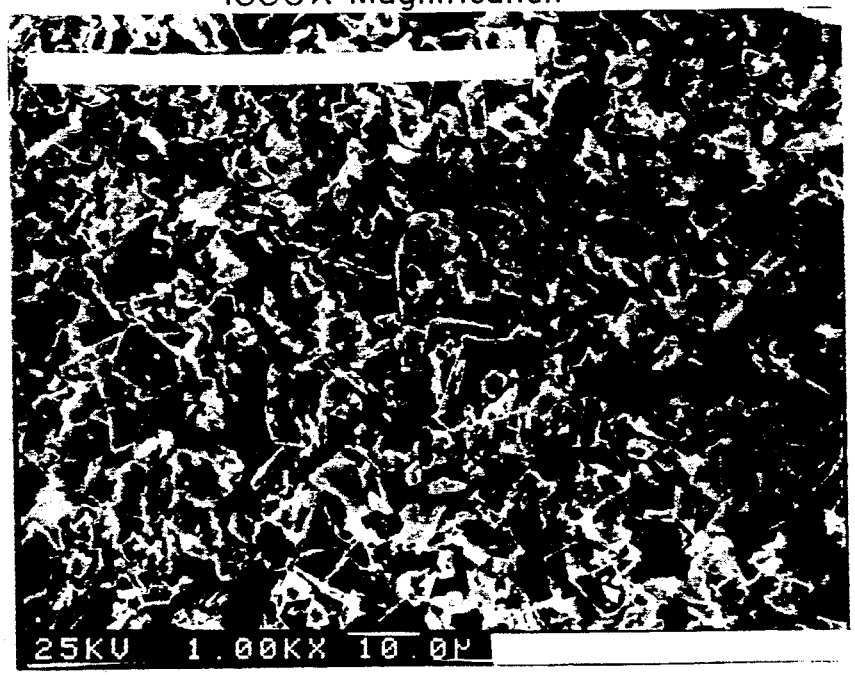
FIG. 2 is a SEM at a magnification of 1000×, of an ingot-derived flaked tantalum powder having a Scott Density of 59.8 g/in$_3$ prepared in accordance with the present invention.

The flaked tantalum powder of the current invention shown in FIG. 2 was prepared from ingot-derived (electron beam melted) 325 mesh tantalum chips. The chips were degassed in a vacuum furnace to remove hydrogen and sieved through a 325 mesh screen. The resulting material was milled in a vibrating ball mill for 10 hours to flatten the chips into flake. This flake was acid leached first in a HCl/HNO$_3$ mixture and then in HF to remove metallic impurities. The resulting flake had a BET nitrogen surface area value of 0.38 m$^2$/g and a Scott density in the range of 10 to 15.2 g/in$^3$. This flake was hydrided and subjected to cold isostatic pressing at 30,000 psi to break the flake into smaller pieces which after pressing are in the form of a solid bar. The solid bar was jaw crushed to 60 mesh producing flakes having a BET nitrogen surface area value of 0.54 m$^2$/g and Scott density of 59.8 g/in$^3$.

Comparison of the flaked tantalum powder shown in Figures (prior art) and 2 (invention) demonstrates that the flake of this invention is comprised of substantially smaller flake particles.

Figure 3:
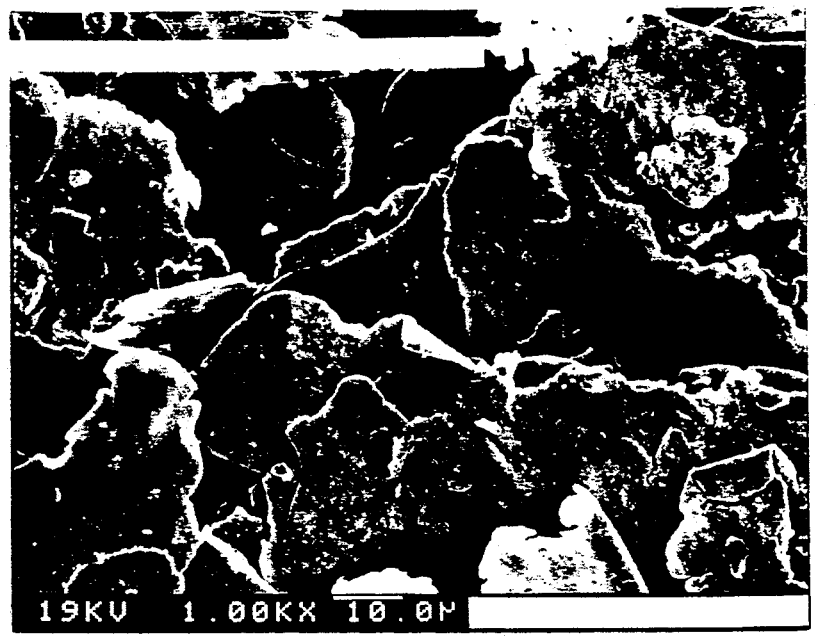
FIG. 3 is a SEM at a magnification of 1000×, of a prior art flaked tantalum powder produced in accordance with Example II, specimen H of U.S. Pat. No. 3,647,415 Yano, et al., and which is an example of a tantalum flake that is not produced in accordance with the teachings of that patent.

The prior art flaked tantalum powder shown in FIG. 3 was made from −60 mesh sodium reduced tantalum powder. The powder was deformed to flake shape by milling in a vibratory ball mill for ten hours. The ball milled flakes were acid leached to remove metallic impurities using 15% HCl and 2% HF. This method corresponds to the procedure described in U.S. Pat. No. 3,647,415 for preparing Specimen H in Example II. The Scott density of the resultant flake was 12.54 g/in$^3$ and 90% of the flakes had no dimension larger than 126 micrometers as shown in Table 1.

Figure 4:
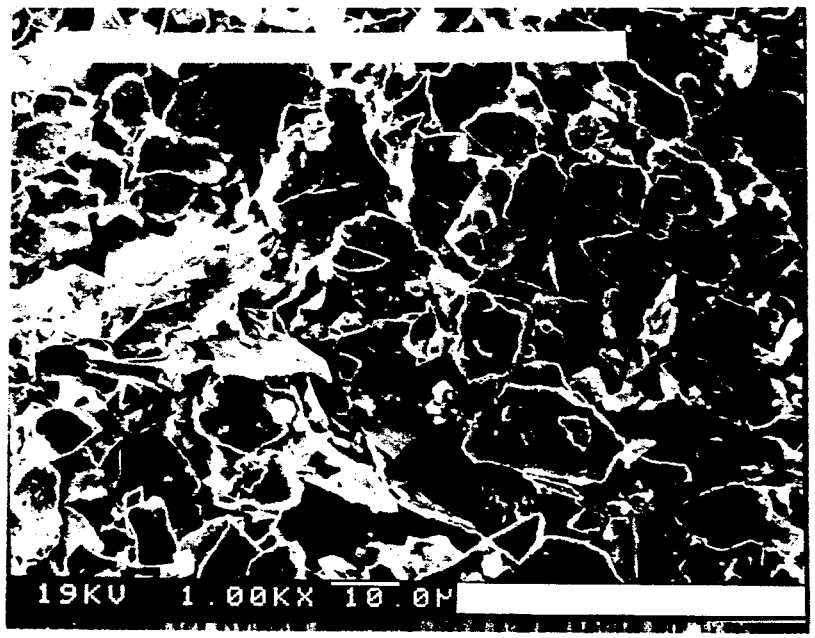
FIG. 4 is a SEM at a magnification of 1000×, of a flaked tantalum powder produced by subjecting the flake of FIG. 3 to the process of the present invention.

The flaked tantalum powder of this invention shown in FIG. 4 was made from −60 mesh sodium reduced tantalum powder. The powder was deformed to flake shape by milling in a vibratory ball mill for ten hours. The ball milled flake was acid leached to remove metallic impurities using 15% HCl and 2% HF. The flake was then heated in a closed vessel until the flake reached about 850° C. Then, however, the heated tantalum flake was hydrided by allowing it to cool to room temperature in the vessel while a positive hydrogen pressure of +5 psi was maintained. The hydrided flake was reduced in size by milling the flake material in a Vortec M1 impact mill, available from Vortec Products Co., Long Beach Calif., U.S.A., operating at 10,000 rpm. The resultant flake had a Scott density of 21.45 g/in$^3$ and about 90% of the flakes had no dimension greater than about 37 micrometers.

The prior art flaked tantalum powder shown in FIG. 5 was made from −60 mesh sodium reduced tantalum powder. This powder had an absorbed hydrogen content of about 125 ppm. The powder was deformed to flake shape by milling in a vibratory ball mill for six hours. Then the ball milled flake was acid leached to remove impurities using 15% HCl and 2% HF. The resultant flake had a Scott density of 12.7 g/in$^3$ and about 90% of the flakes had no dimension greater than about 131.8 micrometers. This method corresponds to the procedure described in U.S. Pat. No. 3,647,415 for preparing Specimen C in Example I.

The flaked tantalum powder of this invention shown in FIG. 6 was made from −60 mesh sodium reduced tantalum powder. The powder was deformed to flake shape by milling in a vibratory ball mill for six hours. The ball milled flake was acid leached to remove metallic impurities using 15% HCl and 2% HF. The flake was then heated in a closed vessel until the flake reached about 850° C. Then, however, the heated flake was hydrided by allowing it to cool to room temperature in the vessel while a positive hydrogen pressure of +5 psi was maintained. The hydrided flake was reduced in size by milling the flake material in a Vortec M1 impact mill operating at 12,500 rpm. The resultant flake had a Scott density of 28.30 g/in$^3$ and about 90% of the flakes had no dimension greater than about 23.2 micrometers.

The flaked tantalum powder of this invention shown in FIG. 7 was made from 100 mesh sodium reduced tantalum powder. The powder was deformed to flake shape by milling in an organic solvent using a Model 15S attritor ball mill manufactured by Union Process Inc., Akron Ohio, USA, for 16 hours to a BET nitrogen surface area greater than about 1.0 m$^2$/gm indicating a thin flake. The ball milled flake was acid leached to remove impurities using 15% HCl and 2% HF. The leached flake was then heated in a closed Vessel until the flake temperature reached about 850 ° C., then cooled to room temperature and hydrided/embrittled under hydrogen +5 psi. The hydrided flake was further reduced in size by milling the flake material in a Vortec M1 impact mill operating at 15,000 to 20,000 RPM. Higher RPMs are effective for fracturing thinner embrittled flake to achieve the aspect ratios in the desired range.

Figure 8:
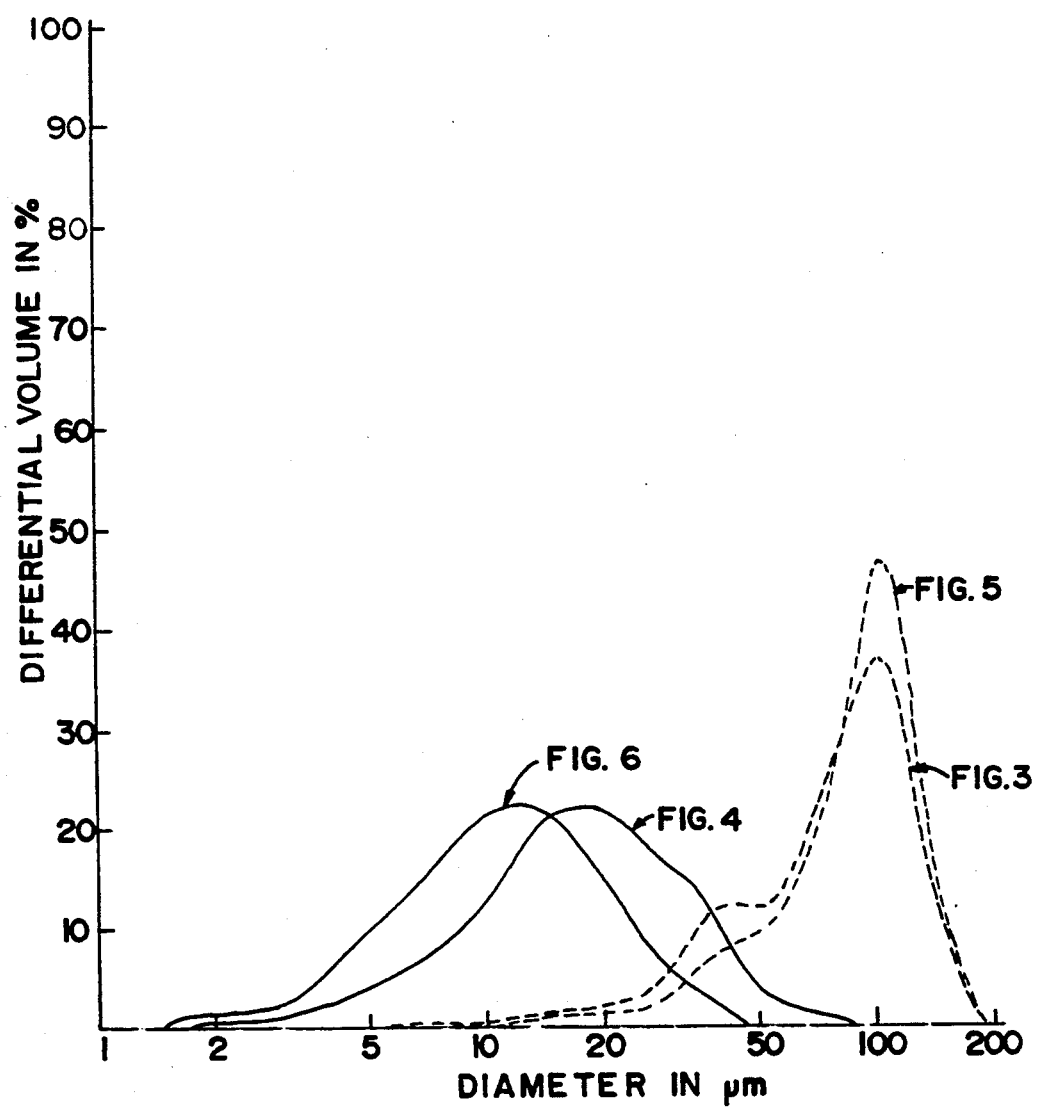
FIG. 8 is a graph showing the particle size distribution of the flaked tantalum powders shown in FIGS. 3 to 6.

It is apparent from FIGS. 8 and 9 and the Granulometer data in Table 1 that the particle size of the flake of this invention is substantially smaller than the particle size of the flake of the prior art. It also appears that the particle size distribution of the flaked powder of the invention is narrower than the particle size distribution of the flake of the prior art.

The mean particle size, BET nitrogen surface area and Scott density of the above-mentioned flaked powders may be measured as described below.

Mean Particle Size

The mean particle size distribution of samples of flaked tantalum powder are determined using a MICROTRAC II ® particle size analyzer available from the Leeds & Northrup unit of General Signal Corporation, U.S.A. This is an apparatus designed to measure the size of particles suspended in a liquid via scattered light and laser optical methods. Particles between 0.34 and 60 micrometers are measured by the amount of scattered laser light and particles between 0.12 and 0.34 by the amount of scattered monochromatic light, impinging on a photodetector array. By means of a self-contained computer, the apparatus determines the distribution of mean particle sizes. The Operator's Manual for the MICROTRAC II ® further describes the measurement method. The sample numbers appearing in Table 1 (F3 through F6) correspond to the flakes shown in FIGS. 3 through 6. The measurements presented in Table 1 were made on a Granulometer as indicated in the footnote. The results of the Granulometer particle size distribution are set forth in Table I and are graphed in FIG. 8. In FIG. 8, the solid lines reference the flaked tantalum powder of the subject invention shown in FIGS. 4 and 6 and the dotted lines reference the prior art flaked tantalum powder shown in FIGS. 3 and 5.

A review of the data in Table 1 reveals that the particle size of the flakes of the present invention are substantially smaller than those of the prior art flakes, which is consistent with comparative screen distribution measurements. Further, the curves of FIGS. 8 and 9 show that the particle size distribution of the flakes of the present invention are much narrower than those of the prior art flakes.

BET Nitrogen Surface Area

The BET nitrogen surface area of flaked tantalum powder samples can be measured with a MONO-SORB ® Surface Area Analyzer available from QUANTACHROME Corporation, Syosset, N.Y., U.S.A.. This is an apparatus designed to measure the quantity of adsorbate nitrogen gas adsorbed on a solid surface by sensing the change in thermal conductivity of a flowing mixture of adsorbate and inert carrier gas such as helium. The methods and procedures for making these measurements are described in the instruction manual for the MONOSORB ® apparatus. All BET surface area measurements referenced herein were made with nitrogen adsorbate gas.

Scott Density

Scott density is determined with an apparatus comprised of a powder flowmeter funnel, a density cup and stand for o the funnel and cup available as a set from Alcan Aluminum Corp., Elizabeth, N.J., U.S.A. The measurement is made by pouring a flake sample through the funnel into the cup (one-cubic-inch nickel plated) until the sample completely fills and overflows the periphery of the cup. Then the sample is leveled-off by means of a spatula, without jarring, so that the sample is flush with the top of the cup. The leveled sample is transferred to a balance and weighed to the nearest 0.1 gram. The Scott density is the weight per cubic inch of the sample.

TABLE I

| Sample No. | F3 (Prior Art) | F4 | F5 (Prior Art) | F6 |
|---|---|---|---|---|
| Screen Distribution (% Sample retained) | | | | |
| % +325 | 61.40 | 3.34 | 67.88 | 1.59 |
| % −325/500 | 13.08 | 4.19 | 8.45 | 1.24 |
| % −500 | 25.52 | 92.47 | 23.67 | 97.17 |
| Scott Density | | | | |
| (g/in³) | 12.54 | 21.45 | 12.70 | 28.30 |
| Granulometer Summary+ | | | | |

TABLE I-continued

| Sample No. | F3 (Prior Art) | F4 | F5 (Prior Art) | F6 |
|---|---|---|---|---|
| (D) 10%* | 33.5 | 6.7 | 41.6 | 4.6 |
| (D) 50%** | 83.5 | 17.4 | 93.2 | 11.1 |
| (D) 90%*** | 126.5 | 37.0 | 130.8 | 23.2 |

+As measured on Compagnie Industrielle Des Laser, Cilas Alcatel Granulometer Model 715.
*Length in micrometers that is greater than the measured diameter of the smallest 10 percent by volume of the particles in the sample.
**Length in micrometers that is greater than the measured diameter of the smallest 50 percent in volume of the particles in the sample.
***Length in micrometers that is greater than the measured diameter of the smallest 90 percent by volume of the particles in the sample.

Agglomeration

The flaked tantalum powders are agglomerated in any conventional manner in order to provide a product which is suitable for subsequent formation into pellets from which capacitor electrodes can be fabricated. Typically, agglomeration involves heat treatment of the flake in a vacuum or inert atmosphere at temperatures in the range of about 1300° to 1600° C. for periods of time ranging from about 30 to 60 minutes. The specific agglomeration technique utilized herein is described below.

Agglomerates were made utilizing the flakes shown in FIGS. 3, 4, 5 and 6. The flakes of FIGS. 3, 4, 5 and 6 were individually heat treated under vacuum at 1440° C. for 30 minutes and jaw crushed to −40 mesh. The flakes were doped with 100 ppm phosphorus and then subjected to a second heat treatment at 1500° C. for 30 minutes and jaw crushed to −40 mesh. The resulting flakes were deoxidized by blending with 2.5% Mg powder and heating under +3 psi Argon pressure to temperature of 950° C. for 320 minutes. The resulting agglomerates were acid leached, to remove MgO and excess Mg, using 15% $HNO_3$ and then rinsed and dried.

Failure to flow is very detrimental since it is impractical to commercially press pellets from agglomerates that do not flow.

Pellet Fabrication and Crush Strength

An agglomerated flaked tantalum powder is compressed in a conventional pellet press without the aid of binders using an imbedded tantalum wire. Two samples of a tantalum powder, one weighing 1.29 g and the other weighing 1.33 g are separately introduced into a die of a pellet press having a diameter of 0.250 inch. The press is set up to press a pellet having a length of 0.330 inch. Utilizing the above weights and lengths an approximate green density of 5.0 g/cc is achieved.

The flaked tantalum powder shown in FIG. 7 was agglomerated and pressed into pellets under conditions similar to those described above. The resulting pellets had a crush strength greater than 50 at 5.0 DP.

Although we have set forth certain present preferred embodiments of our flaked tantalum powder and methods of making same, it should be distinctly understood that our invention is not limited thereto but may be variously embodied within the scope of the following claims.

We claim:

1. A flaked tantalum powder comprised of reduced size flakes without substantial tapering of the peripheral edges thereof and having a mean particle size in the range of about 2 to about 55 micrometers and a BET surface area greater than about 0.5 m²/g; and as aspect ratio between about 2 and about 50.

2. The flaked tantalum powder of claim 1 wherein the tantalum is chemically reduced tantalum.

3. The flaked tantalum powder of claim 2, wherein the mean particle size of the reduced size flake is less than about 45 micrometers.

4. The flaked tantalum powder of claim 1 wherein the tantalum is ingot derived tantalum and said flakes have a BET surface area greater than about 0.7 m²/g.

5. The flaked tantalum powder of claim 1 wherein the mean particle size of the reduced size flake is less than about 45 micrometers.

6. An electrode having low leakage and a high breakdown voltage prepared with the powder of claim 1.

7. A flaked tantalum powder of claim 1, wherein the BET surface area in the range of about 0.5 to about 5.0 m²/g.

8. The flaked tantalum powder of claim 1 or 7, wherein the mean particle size of the reduced size flake is in the range of about 5 to about 20 micrometers.

9. A flaked tantalum powder of claim 1 or 7, wherein the mean particle size is in the range of about 5 to 20 micrometers.

10. A low density pellet prepared from the reduced size flake of claim 9.

11. A capacitor prepared from the pellet of claim 10.

12. The flaked tantalum powder of claim 7 wherein the BET surface area of the reduced size flake is in the range of about 0.5 to about 1.5 m²/g.

13. The flaked tantalum powder of claim 12 wherein the aspect ratio (D/T) of the reduced size flake is in the range of about 5 to about 20.

14. The flaked tantalum powder of claim 7 wherein the tantalum is chemically reduced tantalum.

15. The flaked tantalum powder of claim 14, wherein the mean particle size of the reduced size flake is less than about 45 micrometers.

16. The flaked tantalum powder of claim 7 wherein the tantalum is ingot derived tantalum.

17. The flaked tantalum powder of claim 7 wherein the mean particle size of the reduced size flake is less than about 45 micrometers.

18. An electrode having low leakage and a high breakdown voltage prepared with the powder of claim 7.

* * * * *